United States Patent [19]

Vitale

[11] Patent Number: 4,726,151
[45] Date of Patent: Feb. 23, 1988

[54] RAIN WATER LEADER/GUTTER ADAPTOR

[76] Inventor: Benedetto A. Vitale, 33-63 28th St., Astoria, N.Y. 11106

[21] Appl. No.: 830

[22] Filed: Jan. 6, 1987

[51] Int. Cl.[4] .................. E04D 13/04; E04D 13/08
[52] U.S. Cl. ..................................... 52/16; 405/120; 285/325
[58] Field of Search ............... 405/118, 119, 120, 121, 405/122, 123; 137/872-874; 52/11, 12, 14, 16; 285/283, 325; 403/11, 289, 344

[56] References Cited

U.S. PATENT DOCUMENTS

| | | | |
|---|---|---|---|
| 1,597,283 | 8/1926 | Murray | 52/16 X |
| 3,889,474 | 6/1975 | Frangmeier | 405/120 |
| 3,990,474 | 11/1976 | Harms | 405/120 X |
| 4,028,895 | 6/1977 | Franzmeier | 405/120 |
| 4,182,376 | 1/1980 | Nilsson | 52/16 X |
| 4,270,572 | 6/1981 | Jarzynka | 52/16 X |
| 4,386,484 | 6/1983 | van Berne et al. | 405/119 X |

FOREIGN PATENT DOCUMENTS

| | | | |
|---|---|---|---|
| 2301976 | 7/1974 | Fed. Rep. of Germany | 52/16 |
| 2751471 | 4/1979 | Fed. Rep. of Germany | 52/16 |

Primary Examiner—Nancy J. Stodola
Attorney, Agent, or Firm—Richard L. Miller

[57] ABSTRACT

A rain water leader/gutter adaptor which is adapted to siphon rain water from a gutter. The rain water may be collected inside a gating vessel which is attached to the rain water leader/gutter adapter. In a modified form a leader adaptor is attached to siphon excess rain water from within the rain water leader/gutter adapter once the water collector fills up.

4 Claims, 4 Drawing Figures

U.S. Patent    Feb. 23, 1988    4,726,151
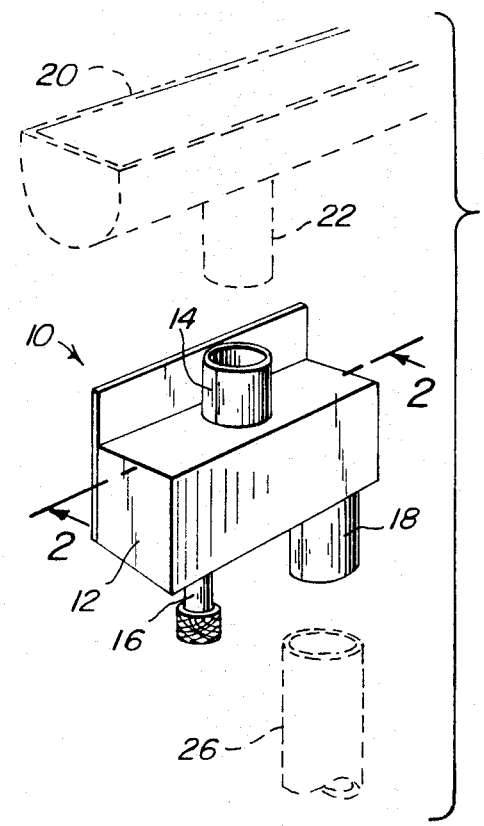
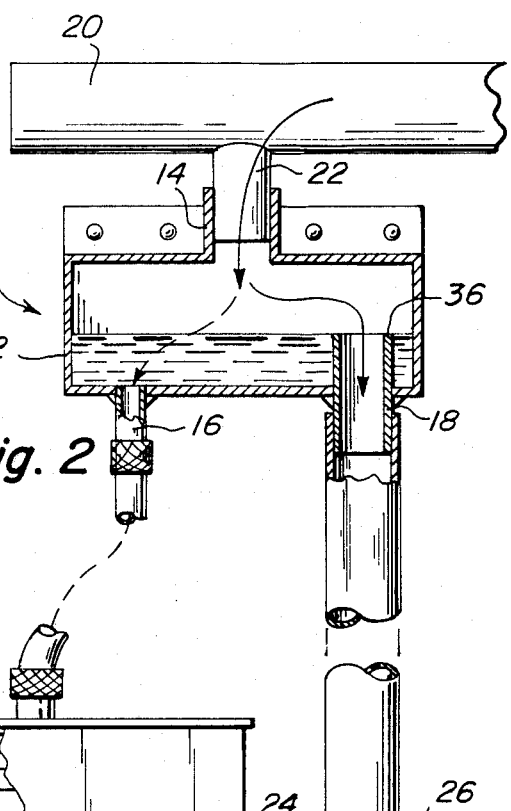
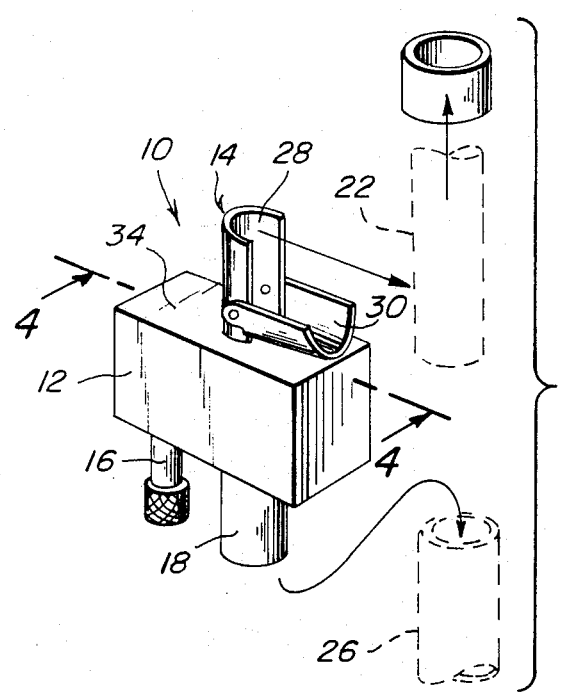
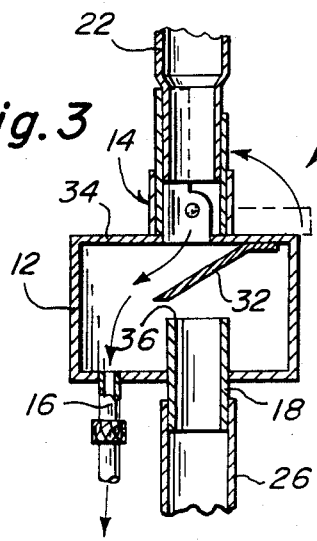
Fig. 1
Fig. 2
Fig. 3
Fig. 4

RAIN WATER LEADER/GUTTER ADAPTOR

BACKGROUND OF THE INVENTION

The instant invention relates generally to rain gutters and leaders and more particularly deals with a means for saving the water from a rain fall.

Numerous rain gutters and leaders have been provided in the prior art that are adapted to direct water flow. For example U.S. Pat. Nos. 4,028,895; 3,889,474 and 4,450,654 all are illustrate of such prior art. While these units may be suitable for the particular purpose to which they address, they would not be as suitable for the purposes of the present invention hereafter described.

SUMMARY OF THE INVENTION

A primary object of the present invention is to provide a rain water leader/gutter adaptor that will overcome the short comings of the prior art devices. Another object of the present invention is to provide a rain water leader/gutter adaptor that has an inlet allowing rain water to be gathered inside a gating vessel and outlets through which rain water is channeled to either a rain barrel for later use or when the rain barrel has filled; excessive rain water is directed out of the gating vessel through a leader.

A further object of the present invention is to provide a rain water leader/gutter adaptor that is simple to attach and easy to use.

A still further object of the present invention is to provide a rain water leader/gutter adaptor that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only and that changes may be made in the specific construction illustrated and described within the scope of the appended claims.

BRIEF DESCRIPTION OF THE DRAWING FIGURES

The figures in the drawings are briefly described as follows:

FIG. 1 is a front perspective view of the invention for being installed between a roof gutter and a leader pipe.

FIG. 2 is a cross sectional view taken on line 2—2 of FIG. 1, showing the device installed and the gating vessel filled.

FIG. 3 is a front perspective view of another design of the invention for being installed between aligned sections of the leader pipes.

FIG. 4 is a cross sectional view taken on line 4—4 of FIG. 2, showing the device installed, while rain water flows to the yet unfilled water barrel.

DETAILED DESCRIPTION OF THE PREFERRED EMBODIMENTS

Turning now descriptively to the drawings in which similar reference characters denote similar elements throughout the several views, FIGS. 1 through 4 illustrate a rain water leader/gutter adaptor generally illustrated by numeral 10.

The rain water leader/gutter adaptor 10, has a gating vessel 12, having inlet pipe 14 and outlet pipes 16 and 18 respectively.

In operative use the rain water leader/gutter adaptor 10 is connected to gutter 20 by gutter pipe 22; which allows rain water gathered in gutter 20 to pass through gutter pipe 22 into gating vessel 12 through inlet pipe 14.

Rain water gathered in gating vessel 12 is channeled to either a rain barrel through outlet pipe 16 or when the rain barrel has filled excess rain water overflows out of gating vessel 12, through outlet pipe 18 which is of such height that one half of gating vessel 12 must fill before rain water reaches the level of the top 36 of outlet 18.

FIG. 3, shows a modification wherein inlet pipe 14 of gating vessel 12, is made up of portion 28 which is rigidly fixed in place and portion 30, which is pivotable to allow gutter pipe 22 to be interposed therein easily. This modification permits the instant invention to be placed in line with an existing gutter pipe 22 and leader 26.

As seen in FIG. 4, is another embodiment in which director 32 is attached to the top 34 inside gating vessel 12 of the rain water leader/gutter adaptor 10, to direct rain water inside gating vessel 12 rather than permit the rain water to instantly flow from inlet pipe 14 to outlet pipe 18, as would occur if this director 32, was not present.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A rainwater leader/gutter adaptor which comprises:
   (a) a gating vessel;
   (b) an inlet pipe on said gating vessel adapted to be connected to a gutter pipe to gather rainwater;
   (c) an outlet pipe adapted to be connected to a leader;
   (d) at least two outlets on said gating vessel to allow rainwater to flow out of said gating vessel;
      (i) one of said at least two outlets being at a lowest level in said gating vessel to direct the flow out of said gating vessel into a rain barrel; and
      (ii) the other one of said at least two outlets being at a level in said gating vessel higher than said one outlet to direct flow to said leader whereby only when the rain barrel is completely filled will the excess rainwater exit through the other outlet to the leader; and
   (e) means to channel rainwater within said gating vessel to the one outlet.

2. A rainwater leader/gutter adaptor as recited in claim 1, wherein said inlet pipe consists of two main portions:
   (a) a rigid portion mounted on said gating vessel; and
   (b) a mating pivotable portion rotatively mounted on said rigid portion, wherein said inlet pipe can clamp around the gutter outlet pipe to permit interposing into an existing vertically oriented leader/gutter pipe system.

3. A rain water leader/gutter adapter as recited in claim 1 wherein said means to channel rain water is responsive to the height of rain water in said gating vessel, wherein when the height of the rain water is greater than a predetermined height a portion of the rain water will exit said outlet pipe.

4. A rainwater leader/gutter adaptor as recited in claim 1, and further comprising an unvented rain barrel connected to said one outlet.

* * * * *